Sept. 1, 1964    P. A. VAN DE BILT    3,146,695
PACKAGING MACHINE
Filed Dec. 26, 1961    11 Sheets-Sheet 1
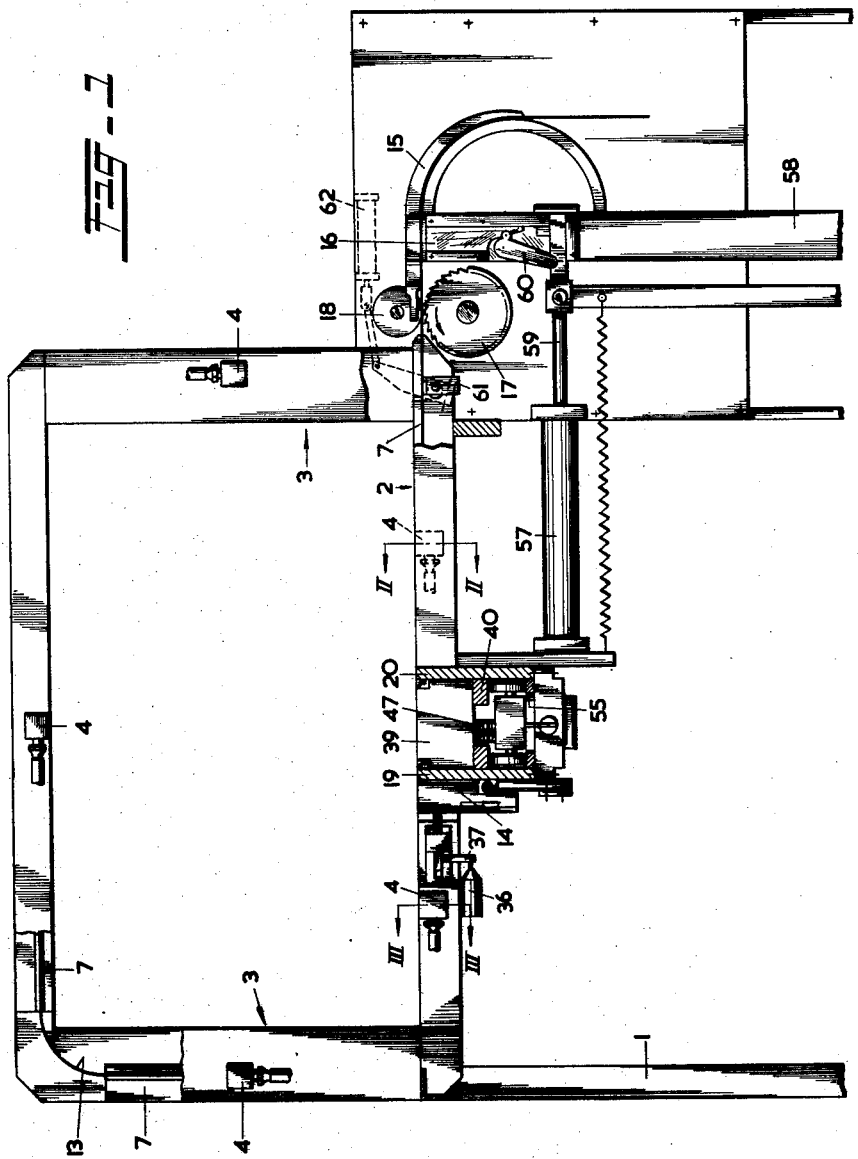
INVENTOR
PIETER ARNOLDUS VAN DE BILT
BY Irvin S. Thompson
ATTORNEY Sept. 1, 1964 P. A. VAN DE BILT 3,146,695
PACKAGING MACHINE
Filed Dec. 26, 1961 11 Sheets-Sheet 2
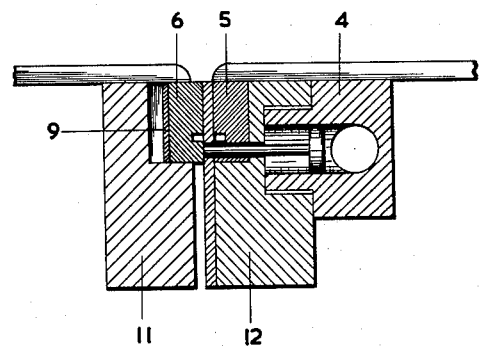
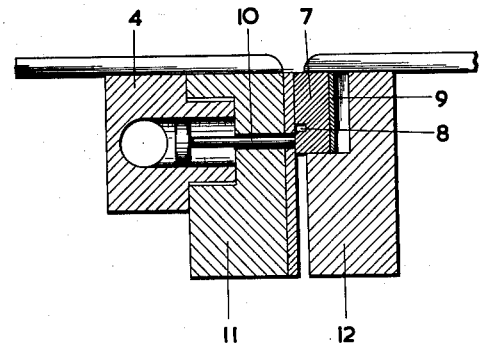
INVENTOR
PIETER ARNOLDUS VAN DE BILT
BY Irvin S. Thompson
ATTORNEY

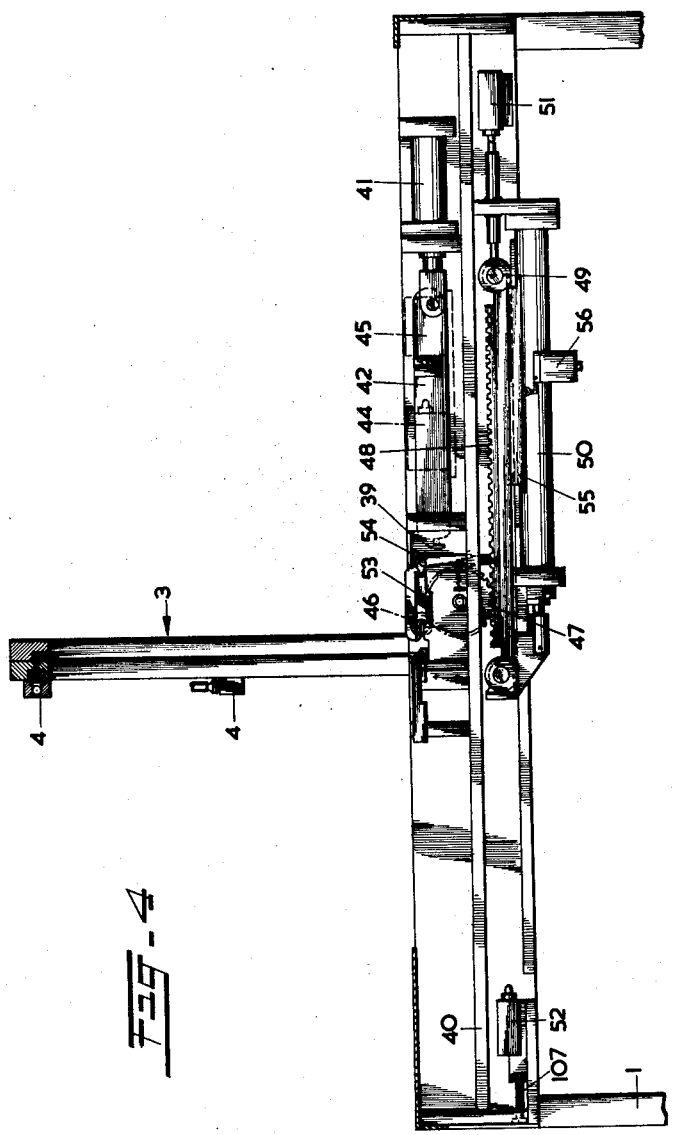

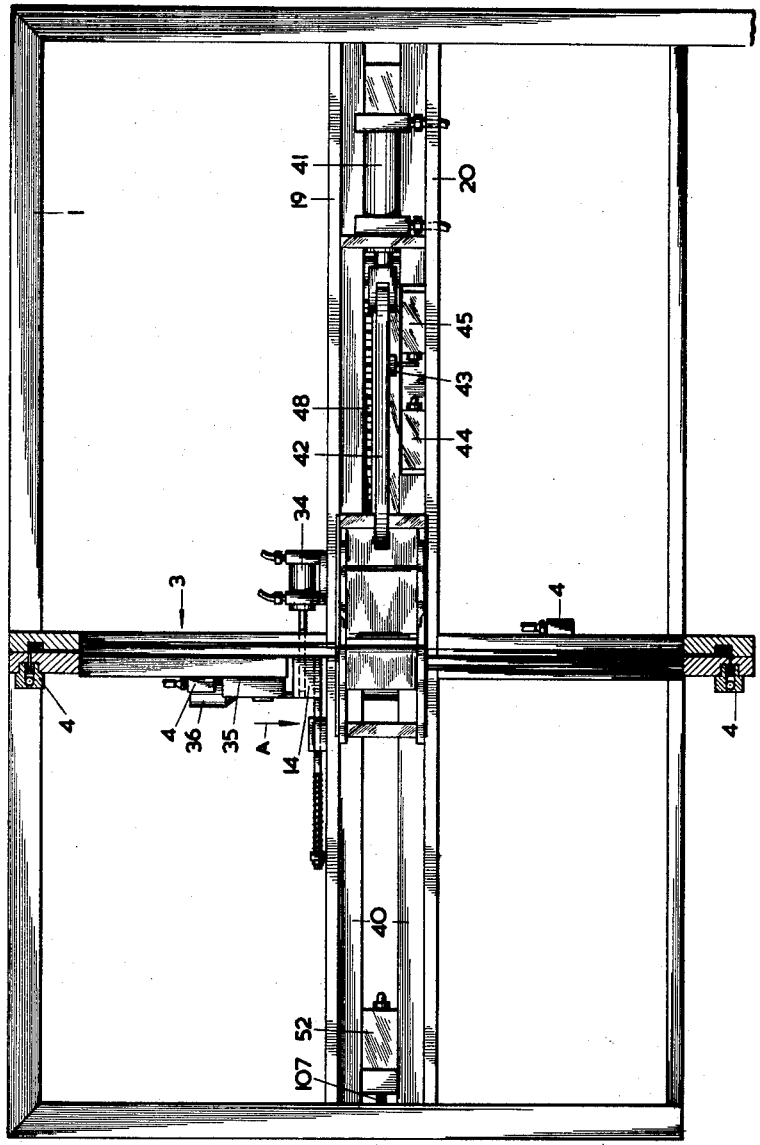

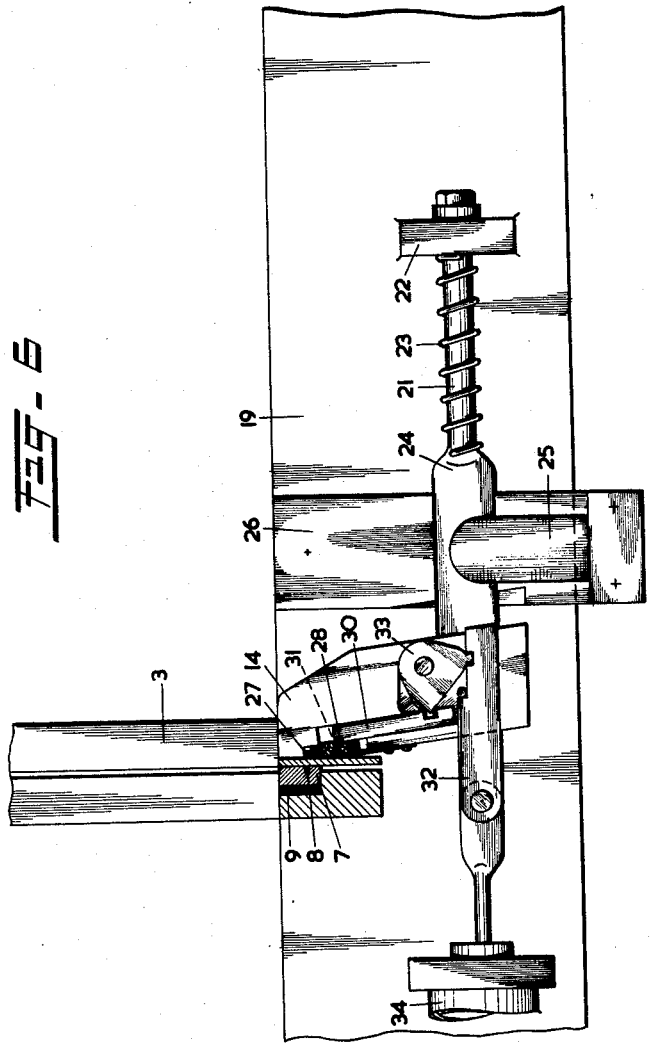

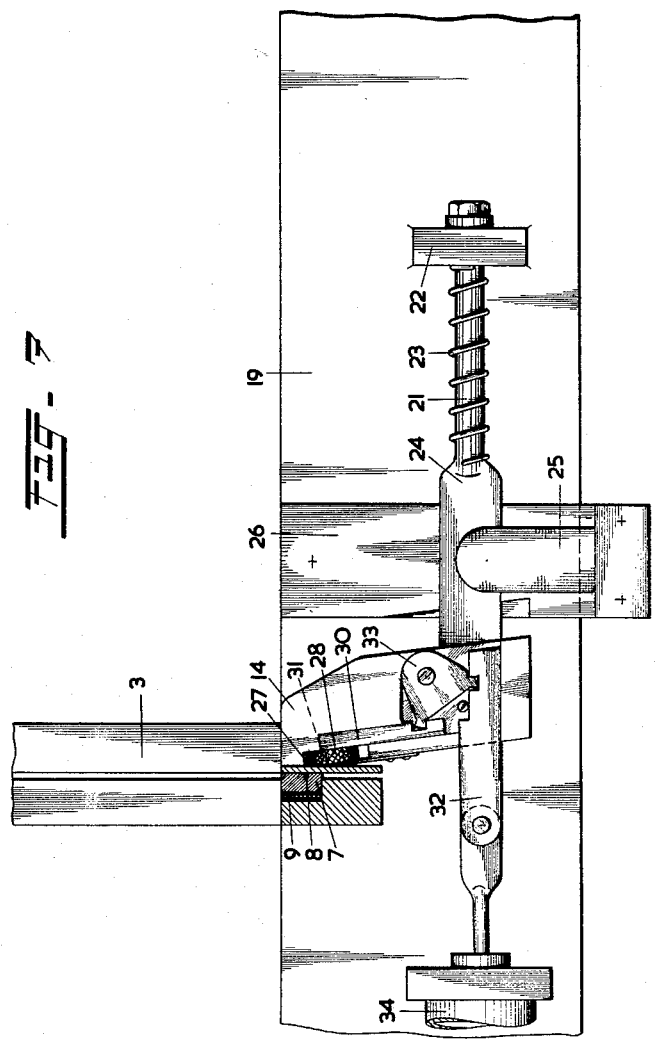

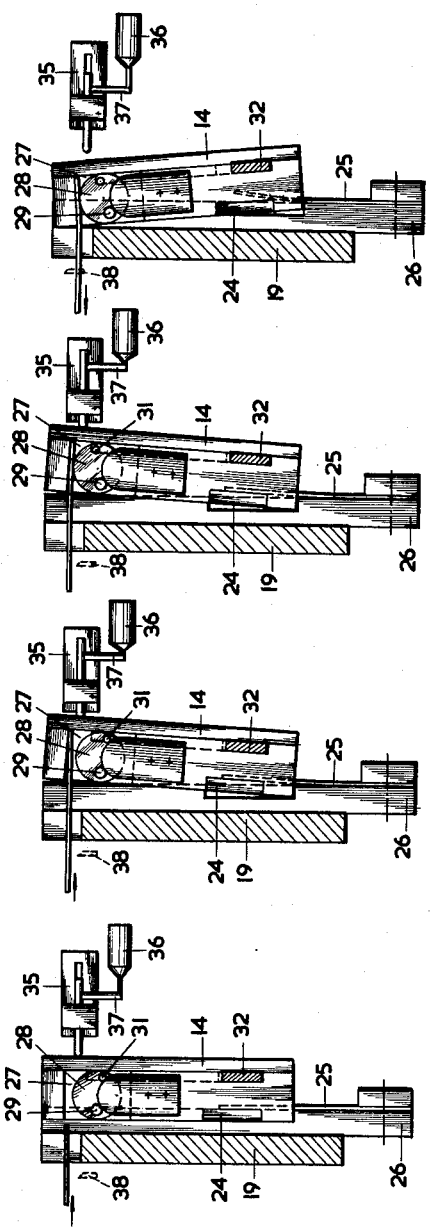

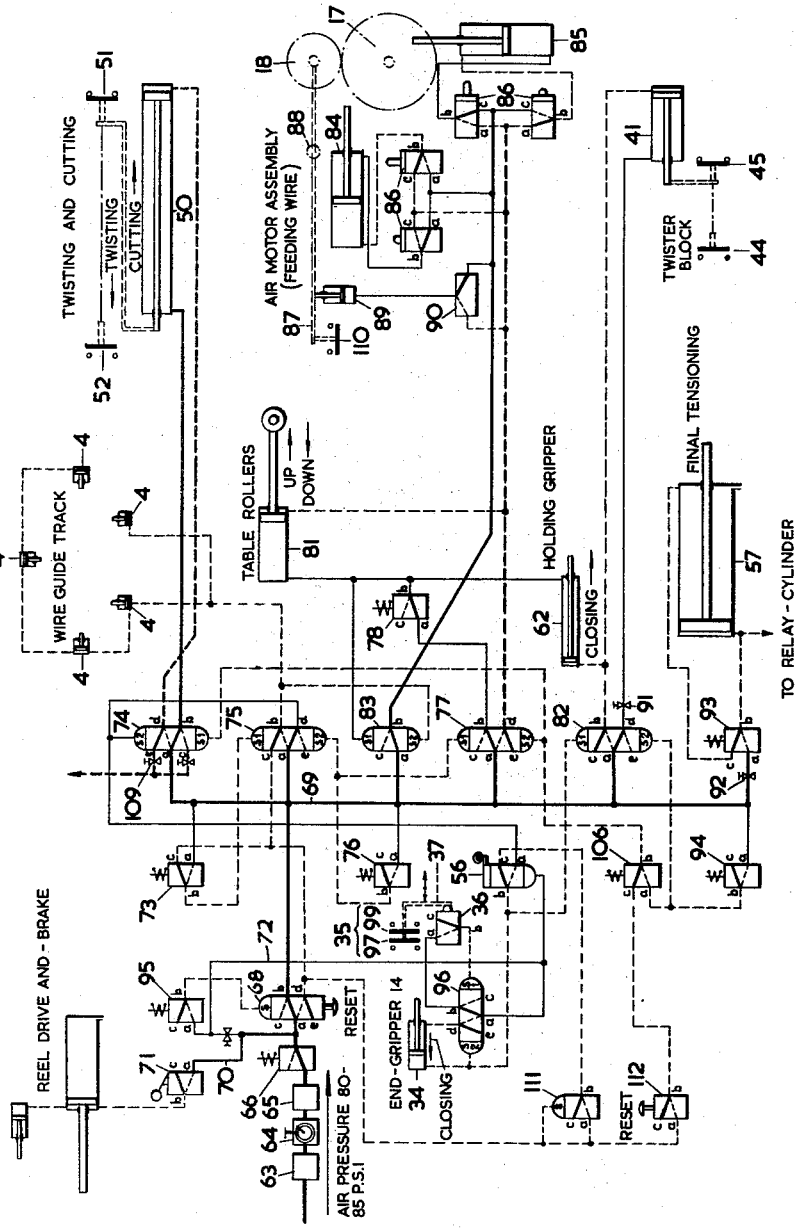

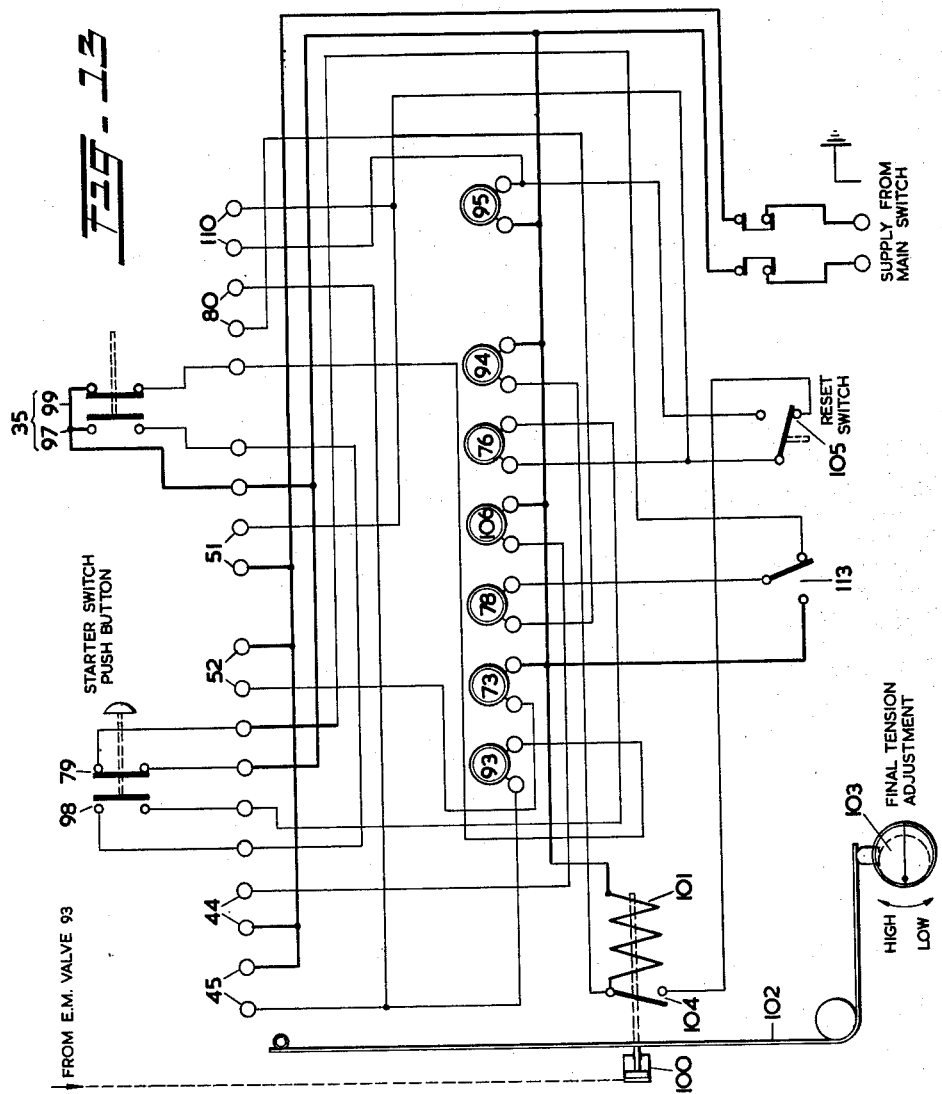

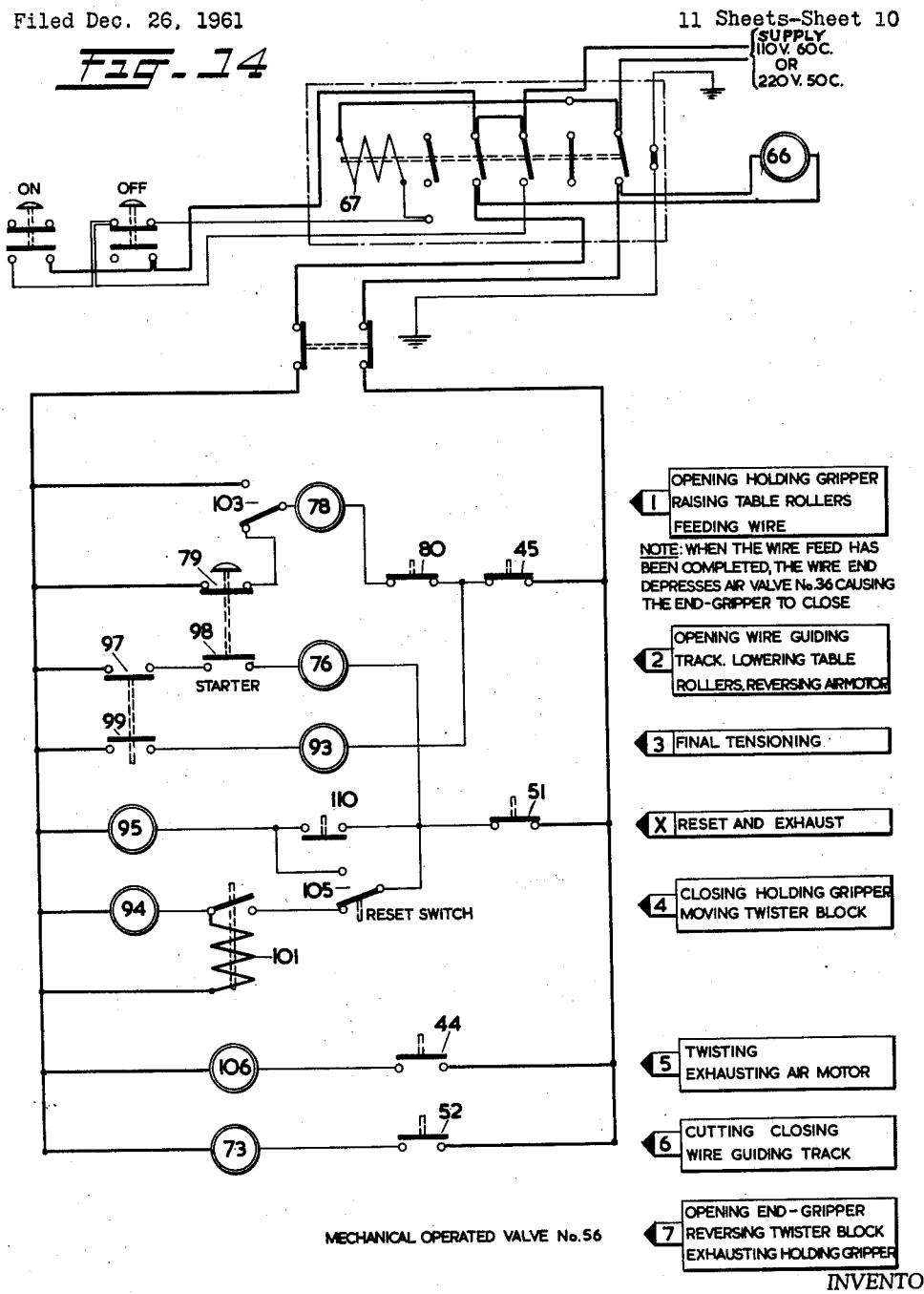

INVENTOR
PIETER ARNOLDUS VAN DE BILT
BY Irvin S. Thompson
ATTORNEY

United States Patent Office 3,146,695
Patented Sept. 1, 1964

3,146,695
PACKAGING MACHINE
Pieter Arnoldus van de Bilt, Bos en Duin, Netherlands, assignor to N.V. Metaverpa, Maartensdijk, Netherlands, a Dutch corporation
Filed Dec. 26, 1961, Ser. No. 161,914
13 Claims. (Cl. 100—4)

The present invention relates to a packaging machine for applying wire around a package or the like, said machine having a top plate for supporting a package, a frame for guiding a wire around the package, said frame having loop formation and being provided with a wire guiding track, said frame having two vertical members and a horizontal beam extending above the upper surface of the top plate, and a horizontal beam extending below said top plate, reversible means to feed wire through the guiding frame and to retract the wire from it, a tiltable clamp at the end of the wire guiding track adapted to receive the leading end of the wire fed through the guiding track, said clamp being tiltable in the direction of movement of the wire, while further means are provided to tension the wire around the package to hold the tensioned wire and to connect the wire ends. A machine of this type has been described in the patent application Serial No. 111,073, filed May 18, 1961, now Patent No. 3,116,681, while with respect to several parts of the specific description reference is made to the following patents or pending patent applications:

U.S. Patent 3,060,840, based upon patent application Serial No. 54,121, filed September 6, 1960, and concerning the wire guiding frame.

U.S. Patent 3,060,841, based upon patent application Serial No. 54,122, filed September 6, 1960, concerning the twisting and cutting mechanism.

U.S. Patent 3,060,839, based upon patent application Serial No. 54,123, filed September 6, 1960, concerning the tiltable clamp.

Serial No. 148,649, filed October 30, 1961, relating to the reversible means to feed wire into the machine and to retract the wire from the guiding frame, which means are formed by an air-motor.

U.S. Patent 3,118,366, based on patent application Serial No. 69,491, filed November 15, 1960, showing a top plate with retractable rollers.

U.S. Patent 3,081,957, based upon patent application Serial No. 69,492, filed November 15, 1960, concerning the reel drive and brake mechanism.

The purpose of the present invention is to provide a packaging machine of the above-mentioned type, which contains a number of improvements with respect to the machine described in the Patent No. 3,116,681, which improvements are also of importance when the specific details of the other patents or applications are used.

Another purpose of the invention is to obtain a simplification of the machine according to the previous proposal.

Still another purpose is the provision of means which allow resetting of the machine if during its operation a cycle cannot be completed.

The present invention now will be further described with reference to the drawings.

FIGURE 1 is an elevation partly in section of the machine according to the invention.

FIGURE 2 is a cross-section according to the lines II—of FIGURE 1.

FIGURE 3 is a cross-section according to the line III—III of FIGURE 1 on an enlarged scale.

FIGURE 4 is a cross-section according to a vertical plane in a longitudinal direction of the machine.

FIGURE 5 is a plan of the greater part of the packaging machine, the top plate carrying the packages being omitted and the vertical parts of the guide for the wire being shown in cross-section.

FIGURES 6 and 7 are side-elevations of the tiltable clamp mechanism in various positions seen from the direction of the arrow $a$ in FIGURE 5, the surrounding parts of the machine having been omitted.

FIGURES 8, 9, 10 and 11 show diagrammatically the different positions of the tiltable clamp.

FIGURE 12 shows the pneumatic diagram of the machine.

FIGURE 13 shows the terminal box of the machine.

FIGURE 14 shows the electrical diagram of the machine from which the sequence of operations can be followed.

Figure 15:
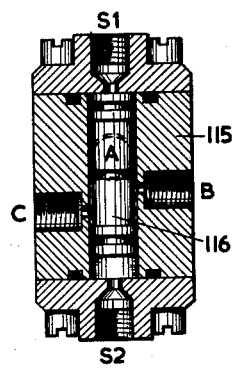
FIGURE 15 is a cross section of a three-way valve as used in the pneumatic system of the machine.

The machine, the main parts of which are shown in the FIGURES 1, 4 and 5, is formed by a frame 1 having a top plate or working table 2 to support the package to be tied, which top plate may be provided with retractable rollers not shown, but performed as for instance described in Patent No. 3,118,366. A wire guiding frame 3 extends above the surface of the top plate and this frame is provided with a wire guiding track formed within guiding members which are shiftable against spring pressure within the frame and are operated by means of pneumatic cylinders 4. This guiding track also extends below the surface of the top plate and a full description of it is found in my U.S. Patent 3,060,840.

As appears from FIGURES 2 and 3, the guiding members are formed by longitudinal bars of rectangular cross-section indicated with the references 5, 6 and 7, which bars are provided with a rectangular channel 8 and are shiftable against the pressure of the leaf spring 9 by means of the piston rod 10 of the pneumatic cylinders 4.

As appears from FIGURES 1, 2 and 3, the guiding frame is formed by the straight bars 11 and 12.

FIGURES 2 and 3 show cross-sections of the horizontal beam of the frame, which extends below the top plate 2 of the machine. The cross-section of FIGURE 3 is representative for the construction of the vertical member of the frame and the upper horizontal beam. At the corners, as appears from the left side of FIGURE 1, the guide track is formed by a fixed curve forming the bottom of a channel which is open towards the opening of the frame. This curve is shaped such that the leading end of the wire leaving the channel 8 of a guiding member 7 correctly enters the channel 8 of the next guiding member 7.

From the cross section of FIGURE 2, it appears that the guiding member 5 is not movable. This is not necessary, since the wire enters the machine through this guiding member and after being fed through the guiding channels of the vertical members and upper beam, the leading end of the wire enters the groove of the guiding member 6 and after passing said guiding member enters a clamp 14.

The wire enters the machine through the guiding track 15 and the final tension clamp 16 and is fed into the machine by means of the rollers 17 and 18, the lower one of which is driven by a pneumatic motor, schematically indicated in FIGURE 12 and more fully described in the patent application Serial No. 148,649. The upper roller 18 is pressed downwardly by means of air pressure as indicated in FIGURE 12. The wire then enters the lower part of the guiding track and is fed through the whole guiding frame until the leading end, after again passing through a guiding member 5 of the lower portion of the frame, enters a clamp 14, which is tiltable in the direction of movement of the wire and also movable in a direction perpendicular to the direction of the wire. The construction of this clamp appears from the Patent 3,060,839 and will be more fully described below.

FIGURES 6 and 7 show a part of the frame 3 for guiding the wire around the package. A longitudinal beam 19 forming part of the frame forms the part to the outside of which the clamp 14 has been fastened, which clamp has been secured to the end of a rod 21, which is supported in a bearing in the member 22 fastened to the beam 19 and is adapted to rotate and move against the action of the spring 23. The end of the rod 21 near the clamp 14 is flat and this flat portion 24 is acted upon by a leaf spring 25, which is fastened to the beam 19 with the interposition of the plate 26. This leaf spring, by cooperating with the flat surface 24, constantly tends to keep the clamp 14 in its vertical center position as appears most clearly from FIGURES 8–11 inclusive.

The clamp 14 is formed by a flat upper jaw member 27 and an upwardly movable round member 28, which is rotatably supported at 29 and can be pressed upwardly by the sliding member 30 fitted with a projection 31 for gripping the wire, said sliding member 30 being actuated by the rod 32 via the connecting member 33. The rod 32 is connected with a pneumatic cylinder 34. When the rod 32 is moved to the left in FIGURES 6 and 7, the jaws of the clamp are shut, which position is shown in FIGURE 7. When the rod 32 moves to the right, the clamp is opened and when this movement continues, the body of the clamp 14 as a whole, along with the rod 24, 21, is moved to the right, in consequence of which a cut-off end of the wire can drop out of the open clamp.

FIGURE 8 illustrates the entry of the leading end of the wire, during which the clamp is still in neutral position. Mounted by the side of the clamp is the switch 35 fitted with various contacts. Below the switch is mounted a pilot valve 36 acted upon by the bar 37. As appears from FIGURE 9, the end of the wire abuts against the side of the clamp, in consequence of which the latter swings around, thus bringing the switch 35 into another position and operating the pilot valve 36. As will be more fully described below, this initiates the closing of the clamp 14, while the operating circuit of the machine is further completed such that if desired the further operations of the machine can be performed. As soon as this is done, the feed of the wire is reversed and at the end of this movement the wire pulls the clamp in the position of FIGURE 11, so that the switch 35 assumes a different position again, which results in initiation of subsequent operations, such as final tensioning the wire by means of the clamp 16, tying the wire ends and cutting the wire by means of the knife 38. This cutting has the result that the clamp 14 returns to the position of FIGURE 8, the switch 35 returning to the neutral position again and in consequence a contact can be closed as a result of which the operation of the cylinder 34 is reversed, which results in that the clamp 14 is moved to the right so that the clamp is opened and the wire drops out of it.

FIGURE 4, being a longitudinal cross section, shows the device for twisting and cutting the wire ends, which device is more fully described in the Patent No. 3,060,841. In short this device consists of a twister block 39, shiftable between frame members 19 and 20 and on horizontal members 40, said twister block being connected with a pneumatic cylinder 41 by means of a rod 42, said rod having a laterally extending portion 43 co-operating with electrical switches 44 and 45. The twister block carries a twister pinion 46, which is in engagement with a gear wheel 47, which itself may be operated by a rack bar 48, which by means of rollers 49 is movable to and fro upon horizontal parts of the frame members 19 and 20. This rack bar is operated by means of a pneumatic cylinder 50 and also co-operates with switches 51 and 52.

The twister block further carries cutting means 53 operated by levers 54 during the return stroke of the rack bar 48.

The rack carriage operates an elongated cam 55, which in turn operates a pilot valve 56. The function of this valve will be described below.

As appears from FIGURE 1 the final tensioning clamp 16 is operated by means of an air-pressure cylinder 57. The clamp 16 is mounted within a lever 58, which is pivotally mounted at its lower end. Between the piston rod 59 and the clamp 16 a lever 60 has been arranged such that when the rod 59 is moved to the right, the lever 60 swings counter-clockwise and moves the clamp members 16 upwardly. Due to the fact that the rod 59 is shiftable with respect to the lever 58, the clamp 16 is closed first and after being closed the cylinder 57 moves the lever 58 with the clamp 16 to the right to tension the wire around the package.

At the end of this operation the holding gripper 61 is put into operation by means of its pneumatic cylinder 62.

The operation of the machine now will be more fully described with respect to the FIGURES 12, 13 and 14.

The air entering the pneumatic circuit of the machine passes through the filter 63, the regulator 64, the lubricator 65 and the electro-magnetic master valve 66. This master valve 66 is energized by means of the main switch 67. Beyond this valve 66 the air passes a reset valve 68 towards a multi-connection line indicated by the line 69.

Between the valve 66 and 68 a conduit 70 is directed to the drive and brake mechanism of the reel carrying the wire supply, which conduit is controlled by a valve 71 operated by the tension of the wire exactly as described in the Patent No. 3,081,957. Furthermore through the line 72 air is supplied to the end-gripper clamp 14.

The multi-connection line 69 is connected with:

(1) The electro-magnetic valve 73, which in the position shown is not energized.

(2) Through $a$–$b$ of valve 74 to the front of cylinder 50 of the rack bar 48.

(3) Through $a$–$d$ of the slide valve 75 to the pilot port $s2$ of slide valve 74 and to the pilot valve 56, which at that moment is not operated by the cam 55 of the rack bar 48.

(4) To the electro-magnetic valve 76, which is not energized.

(5) Through $a$–$b$ of valve 77, via $a$–$b$ of the electro-magnetic valve 78, which is energized (see FIGURE 13) via the closed contacts 79 of the starter switch, via contacts 80 of a safety switch which is only closed when the door giving access to the interior of the machine is closed, and via the switch 45, which is only closed when the twister block is in its initial position.

From the valve 78 air flows to the front of the cylinder 62, which cylinder operates the clamp holding the wire under tension when tensioned by the cylinder and clamp assembly 57, 16. By supplying air to the front of the cylinder 62 this clamp is opened. Further air is supplied to the rear of cylinder 81 to raise the table rollers, so that a package can be easily moved over the top plate of the machine. When raised these rollers extend slightly above the upper surface of the top plate. The front of cylinder 81 is exhausted through $d$–$e$ of slide valve 77, while the rear of cylinder 62 is exhausted to $b$–$c$ of valve 82. Further air is supplied to the pilot port $s1$ of the slide valve 83, which due to this allows flow from $a$–$b$.

(6) Through $a$–$b$ of valve 83 to the air-motor assembly consisting of two pneumatic cylinders 84 and 85, which rotate the roller 17. The supply and discharge of air to the front and rear sides of the pistons of these cylinders are controlled by the valves 86 as shown and more fully described in the patent application Serial No. 148,649. The air-motor exhausts via $d$–$e$ of the slide valve 77. The roller 18 is pressed against the roller 17 or against the wire if a wire is fed between the rollers 17 and 18 by means of a lever 87 pivotally supported at 88, upon which lever a pneumatic cylinder 89 operates receiving its pressure via the selector valve 90 from said air-supply line to the air-motor assembly, which is under pressure.

(7) Further air is fed through *a–d* of slide valve 82 via speed control 91 to the front of cylinder 41 to keep the twister block in its initial position.

(8) Via speed control 92 to the electro-magnetic valve 93 which is not energized.

(9) To the electro-magnetic valve 94, which is not energized either.

Via the conduit 70, air is also supplied to an electro-magnetic valve 95 not being energized and adapted to control the reset valve 68, while further air is supplied through *a–b* of slide valve 96 to the unoperated pilot valve 36 and further to the pilot port of the pilot valve 56.

At the end of its travel through the wire guiding track, the leading wire end is pushed into the mouth of the tiltable clamp 14 and due to its driving force this wire end tilts the clamp 14 with the result that the pilot valve 36 is operated by a lever 37. This means that air can flow via *a–b* of valve 36 towards the pilot port *s*1 of the slide valve 96, which is shifted into a position in which air may flow through *a–d* to the front of a piston and cylinder unit 34, the piston rod of which is connected with the tiltable clamp 14 so that this clamp is closed. In this way the leading end of the wire is gripped. Tilting of the clamp 14 also causes the closing of a contact 97 of the switch 35 due to which the machine now is ready for a next operation as follows from the diagram of FIGURE 13.

It is observed that when the leading end of the wire has tilted the clamp 14, the wire stops and the air motor is no longer able to feed the wire. As a result of this the air motor simply stalls.

With a package to be tied placed on the top plate of the machine within the wire guiding frame, a tying operation can be started by operating the starter switch push button with the result that the contact 79 opens and the conact 98 closes. Operation of the starter switch push button can take place manually or by any other suitable means operated by the packafie itself, for instance as described in Patent No. 3,118,366.

Closing of the contact 98 means that the electro-magnetic valve 76 is energized via the contacts 97, 98 and 51. Energizing this valve 76 means that air is directed through *a–b* of this valve to the pilot port *s*1 of the slide valve 77 and to the pilot port *s*2 of the slide valve 75. The slide valve 77 is then operated so that the air supplied to the electro-magnetic valve 78 is exhausted via *b–c*, which also means that the air pressure on the side of the pilot port *s*1 of the slide valve 83 is released while further the pressure on the cylinder 81 of the table rollers and on the cylinder 62 of the holding gripper is released. This means that the rollers are lowered below the surface of the top plate, so that the package is supported by said plate. Valve 75 operated at the same time cuts off and exhausts through *d–e* the air supplied to the pilot port *s*2 of the slide valve 74 as well as the air supplied to the pilot valve 56 and directs air pressure through *a–b*:

(1) To the small cylinders 4 of the wire guiding frame 3 causing the opening of the wire guiding track.

(2) To the pilot port *s*2 of the slide valve 83, which reverses and exhausts via *b–c* the air pressure supplied to the air-motor.

The operation of the valve 77 also causes air to be directed through *a–d*:

(1) To the air-motor assembly, so that the air-motor starts running in the opposite direction, thereby retracting the wire from the opened wire guiding track.

(2) To the front of the cylinder 81 to lower the table rollers.

As soon as the air-motor starts to retract the wire, the tiltable clamp 14 will return into its initial upright position and opens contact 97. This means that the electro-magnetic valve 76 is de-energized.

At the end of the wire retracting movement, the wire drawn around the package will pull the tiltable clamp into an opposite tilted position, against the resistance of the leaf spring, which causes closing of the contact 99 of the switch 35. Closing of the contact 99 energizes the electro-magnetic valve 93 (since contact 45 is also closed) and due to this, air is directed through *a–b* of the valve 93 to the rear of the cylinder 57 causing this cylinder to extend thereby closing the clamp 16 and moving this clamp to obtain final tensioning of the wire around the package. Furthermore air is supplied to the small cylinder 100 of the air operated relay 101. This relay will not be operated immediately due to the resistance of a pre-tensioned leaf spring 102, the tension of which can be adjusted by the means 103. As soon as the air in both cylinders has built up sufficient pressure to give the small cylinder 100 enough driving force to surmount the action of the leaf spring 102, the contact 104 of the relay 101 will be closed, which causes energization of the electro-magnetic valve 94 and of the solenoid of the relay 101 via its holding contact, reset switch 105 and contact 51.

When the electro-magnetic valve 94 is operated, air is directed through *a–b* to the electro-magnetic valve 106, which is not yet energized, and to the pilot port *s*2 of the slide valve 82. This valve operates and cuts off and exhausts through *d–e* the air supplied to the front of the cylinder 41 and directs air through *a–b* to the rear of the cylinder 62 with the result that the clamp adapted to hold the tensioned wire is closed. Air is also supplied to the rear of the cylinder 41 causing the twister block 39 to be pushed forwardly so that the slot of the twister pinion 46 is placed over the wire ends. As soon as the twister block starts moving, the contact 45 is opened, which means that the electro-magnetic valve 93 is de-energized, allowing the cylinder 57 of the final tensioning clamp 16 to exhaust via *b–c* of said valve and to be retracted by the lever 58. At the same time the small cylinder 100 of the relay 101 will be exhausted. The contact 44 closes as soon as the twister block completes its forward stroke, which means that the twister block 39 now is in the twisting and cutting position.

Due to closing of the contact 44, the electro-magnetic valve 106 is energized and air is supplied via the electro-magnetic valve 94, which is still energized, through *a–b* of valve 106 to pilot port *s*2 of valve 77 as well as to pilot port *s*1 of valve 74. The valve 77 reverses and directs pressure through *a–b* to electro-magnetic valve 78, which is not energized, at the same time exhausting the air-motor completely via *d–e* as well as the front of cylinder 81. Valve 74 is operated and exhausts through *b–c* the front of cylinder 50 and directs air through *a–d* to the rear of cylinder 50, causing it to extend and to shift the rack bar 48 so that the twister pinion 46 will be rotated.

The rack carriage driven by the cylinder 50 in moving forward first opens the contact 51, which means that the relay 101 and the electro-magnetic valve 94 are de-energized thus causing the air supplied to pilot port *s*2 of valve 77 and to pilot port *s*1 of valve 74 to exhaust via *b–a* of valve 106 (still being energized via contact 44) and through *b–c* of valve 94, which is now de-energized.

The slotted twister pinion will twist the wire ends together by making three complete revolutions, plus a part of another revolution to set up an overtwist in the tie.

Completing the overtwist, the rack-carriage closes the contact 52, which means that the electro-magnetic valve 73 is energized and supplies air pressure through *a–b* to the pilot port *s*1 of valve 75. Valve 75 reverses thereby cutting off and exhausting through *b–c* the air supply to the pilot port *s*2 of valve 83 and to the small cylinders 4 of the wire-guiding track. These small cylinders now being exhausted allow leaf-springs 9 to push the wire guides into a position in which the wire guiding track is closed.

It will be understood that the amount of overtwist depends on the position of the contact 52, which as appears from FIGURES 4 and 5 is adjustably mounted in the frame by means of the screw spindle 107.

Reversing of the valve 75 also allows air to pass through a–d to the pilot port s2 of valve 74 and to valve 56. Valve 74 reverses and directs air through a–b to the front of cylinder 50 and exhausts the rear of this cylinder through d–e. The exhaust-air passes an adjustable restrictor 109, providing a back-pressure against which the cylinder must retract. This allows for adjustment of the operating speed of the rack-carriage. This also takes place during a forward movement of the rack-carriage.

During the forward movement of the rack-carriage the cam 55 depresses the valve 56, but this has no effect because due to the position of the valve 75 there is no air-pressure on the port a of the valve 56. During the return movement of the rack-carriage, first contact 52 is opened so that the valve 73 is de-energized. Further the twister pinion is allowed to turn back into a position in which the slot of the twister pinion is opened, so that the twist can leave this pinion. The cutters are then operated to sever the wire from the supply and to cut off the leading end kept by the tiltable clamp. The tiltable clamp is then returned into its upright position by the leaf spring 25, but still grips the cut wire-end piece. The valve 56 is then again operated by the cam 55 and, due to the fact that air pressure is supplied to the port a of this valve, the air flows through a–b to the pilot port s2 of the valve 96 and to the rear of the cylinder 34. This means that the valve 96 is reversed, while the piston of the cylinder 34 opens the clamp and pushes it away from the wire so that the wire piece may be dropped as described with reference to FIGURES 6 to 11 inclusive.

Furthermore air-pressure is supplied to the pilot port s1 of the valve 82 which reverses, supplying air through a–d via the speed control 91 to the front of cylinder 41 simultaneously cutting off and exhausting through b–c the air supplied to the rear of the cylinder 62 and to the rear of cylinder 41, so that the holding gripper cylinder is exhausted and the twister block is returned to its initial position. The purpose of speed control 91 is to give the possibility of a delayed retracting action on the twister-block, thus making sure that the cut wire-end piece dropped is out of the reach of the twister-block when the latter moves back. This is necessary when light gauges of wire are used.

When the twister-block moves back, it opens the contact 44, which causes de-energization of the electro-magnetic valve 106. Further the finished tie leaves the twister pinion and, at the end of the return movement, the contact 45 is closed again. This contact 45 has to be closed to energize the electro-magnetic valve 78 to raise the table rollers and to operate the slide valve 83 allowing the air-motor to feed wire into the machine.

Just before completing its return stroke, the cam 55 ceases to depress the operating lever of the valve 56, which valve then cuts off and exhausts through b–c the air-pressure to the pilot port s1 of the valve 82, to the pilot port s2 of the valve 96, and to the rear of the cylinder 34. The exhausting of the cylinder 34 permits the clamp 14 to be returned by its compression spring 23 into its initial upright and open position, ready to receive the next wire-end.

If necessary, the operation of the machine can be interrupted at once and at any moment by pressing the bottom marked "off," causing de-energization of the main switch 67. This cuts off the electric supply to the machine thereby de-energizing the master valve 66, which cuts off the air-supply to the machine and simultaneously exhausts the entire air-system. Pressing the button marked "on" will start the machine immediately to complete the cycle, except when the interruption took place after the twister-block has started to move forward, and before rack-driving cylinder 50 has started to extend. The reason being is that relay 101 has been de-energized too and, since it is an air-operated relay, it cannot be re-energized without air-supply by means of the electro-magnetic valve 93.

In this circumstance the operator has to proceed as described below.

If for any reason the machine will not complete its cycle although power supply and air-pressure are correct, the reset-valve 68 has to be operated by means of the electro-magnetic valve 95. This can be done manually by depressing the reset-switch 105 with the result that its normally closed contact is opened, while another normally opened contact is closed. Opening the first mentioned contact de-energizes the solenoid of the relay 101 which is still being energized. Closing of the other contact energizes the electro-magnetic valve 95, which allows air to flow to the pilot port of the reset valve 68. This electro-magnetic valve 95 can only be energized if the main switch has been switched on, air pressure has been supplied to the machine, and the rack-carriage is in its initial position with the contact 51 closed. The purpose is that the machine cannot be reset when a partly finished tie is in the twister pinion mouth.

The energization of the electro-magnetic valve 95 is also caused automatically when the end of the wire passes the point between the rollers 17 and 18 of the feeding device. The roller 18 then will move downwardly with the result that the contact 110 will be closed assisted by the operation of the pressure cylinder 89. Due to the springly character of the lever 87, the contact 110 will be opened again as soon as pressure in the air system has been exhausted.

Operation of the reset-valve 68 due to energization of the electro-magnetic valve 95 not only exhausts through b–c the main part of the air-circuit, but simultaneously directions air through a–d:

(1) Via c–b of electro-magnetic valve 73 to the pilot port s1 of valve 75, which is brought into a posion in which air through c–b may flow to the small cylinders 4 of the wire guiding frame to open the guiding track.

(2) Via a–b of the pressure operated valve 111, which is operated so that air may flow through a–b of this valve and through c–b of valve 56 to the pilot port s1 of valve 82 and to the pilot port s2 of valve 96, as well as to the rear of the cylinder 34, with the result that the tiltable clamp 14 is opened, while the twister block is returned to its initial position.

After having checked out the machine, valve 112 has to be operated manually to direct air through a–b via c–b of the electro-magnetic valve 106 to the pilot port s2 of valve 77 and consequently also to the pilot port s1 of valve 74. Valve 77 is reversed if being operated, and valve 74 will operate but will be reversed immediately as soon as the reset-valve 68 has been reversed manually by depressing its button. Thus being reversed, reset-valve 68 cuts off and exhausts via d–e the air-press supplied to the points mentioned above allowing the wire guiding track to close again and the tiltable clamp to be returned into its initial position.

With the wire end re-inserted via the guiding track 15 and the final tension clamp 16 and between the rollers 17 and 18, the machine will start feeding wire as soon as the contact 89 has been closed, which contact is operated by a door (not shown) giving access to the interior of the machine necessary to insert a new wire.

FIGURE 13 shows a further switch 113 which, when set in the position as shown, prevents the air-motor from re-feeding wire after having completed a tie as long as the switch for starting a tying cycle will be depressed (contact 79 being opened). If set in the other position, wire will be re-fed automatically after completion of a tie.

FIGURE 15 shows a slide valve according to the slide valve 83 of the diagram of FIGURE 12. As appears from this figure the housing 115 has a central bore in which a slide 116 may be shifted by means of air pressure supplied to the ports s1 or s2. Further air pressure is supplied through the port A and may leave through B when the slide 116 is in its lower position, while air may escape from B–C when the slide is in the position shown.

Figure 16:
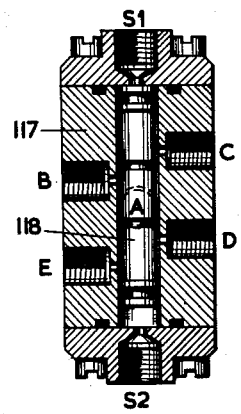
FIGURE 16 is a cross-section of a four-way valve as used in the pneumatic system of the machine.

FIGURE 16 shows a cross-section of a slide valve corresponding to the valves 74, 75, 77, 82 and 96 of the diagram of FIGURE 12. Just as the valve of FIGURE 15, the housing 117 has a central bore and pilot ports s1 and s2 through which air may enter and shift a slide member 118. In one position there is a connection between the ports A and B as well as between E and D, while in the other position there is a connection between A and D as well as between B and C.

Figure 17:
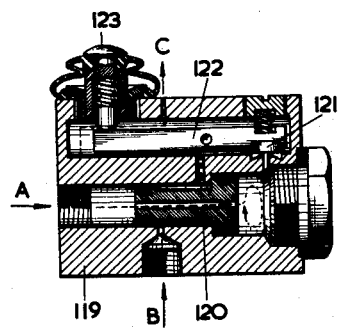
FIGURES 17 and 18 show the construction of a pilot valve in cross-section.
Figure 18:
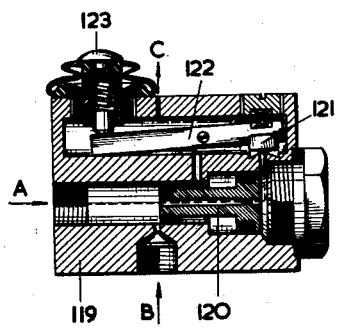

FIGURES 17 and 18 show the construction of the pilot valve 36.

Air entering the valve-housing 119 at A may leave the housing through B if a piston 120 slidable in the central bore of the housing is shifted to the right as shown in FIGURE 18. This piston has a small bore with bleeder opening and piston surfaces of different area, so that air-pressure entering by A may pass the bore and bleeder opening of the piston and build up the same pressure on the right side of the piston 120 so that due to its larger area the piston is shifted to the left. This means that there is a connection between the ports B and C. The space on the right side of the piston with the greater surface is closed by a valve 121, which may be opened by means of the lever 122 operated by the push button 123. As soon as the push button 123 is operated, which requires only a very slight force, the pressure on the right side of the piston 120 is exhausted quicker than the supply through the bleeder opening, so that this piston will be shifted to the right and connect the ports A and B.

The valve 56 in principle operates in the same way. Air entering its pilot port passes through central and bleeder opening bore in the slide to an upper space, having a piston with a greater area and being closed by a valve, which may be opened by a lever. As soon as the lever is operated by the cam 55 air can escape from this space, so that the air pressure supply to the pilot port can shift the slide piston.

I claim:

1. A packaging machine for applying wire around a package or the like, said machine having a top plate for supporting a package, a frame of loop formation provided with a wire track for guiding a wire around the package, said frame having a lower horizontal beam immediately below the top plate, first and second vertical members extending upwardly from the ends of the lower horizontal beam, an upper horizontal beam extending between the upper ends of the vertical members, said lower beam having a first wire-receiving channel extending therethrough, the first vertical member having a vertical channel connected at its lower end to the first channel of the lower beam and forming a continuation thereof, said upper beam having a channel extending therethrough connected at one end to the upper end of the channel of said first vertical member, the second vertical member having a channel connected to the other end of the channel in the upper beam and extending downwardly, said lower beam having a second channel connected to the lower end of the channel in said second vertical member and extending through the lower beam in offset overlapping relation to the first channel in said lower beam, said channels in the vertical members and the upper beam being serially connected between the first and second channels in the lower beam to provide a wire-guiding track of loop formation, reversible means to feed wire through said wire-guiding track to form a loop with the portion adjacent the leading end of said wire in the second channel of the lower beam overlapping a portion of the wire in the first channel of the lower beam and to retract the wire from said track, a tiltable clamp at the end of the second channel of the lower horizontal beam, said clamp having wire-gripping means movable between opened and closed positions and adapted to receive the leading end of the wire fed through the track of the frame and to tilt in the direction of feed movement of the wire when engaged by said leading end of the wire, a pneumatic cylinder for moving the wire-gripping means between opened and closed positions, means for releasing a loop of wire from the track in the frame upon reversal of said feed means to embrace the package, means for tensioning the loop of wire about the package, means for holding the tensioned wire, means for connecting the ends of the tensioned loop of wire about said package, a pneumatic circuit for air under pressure, a pneumatically operated slide valve for controlling the flow of air into and from the pneumatic cylinder, a pilot valve in said circuit, and means operable by tilting movement of the tiltable clamp produced by the leading end of the wire for actuating the pilot valve to admit air to a pilot port of the slide valve to actuate said slide valve to supply air to said cylinder.

2. A machine according to claim 1 further comprising a second pilot valve in the pneumatic circuit, and means actuated by the wire-connecting means for operating the second pilot valve to supply air to an opposite pilot port of the slide valve and to the opposite end of the cylinder to move the wire-gripping means to opened position.

3. A machine according to claim 1 further comprising sets of electrical contacts, one set of which is comprised by the means for actuating the pilot valve and is positioned adjacent the tiltable clamp so as to be closed when said clamp is tilted by the leading end of the wire.

4. A machine according to claim 1 further comprising sets of electrical contacts, one set of which is comprised by the means for actuating the pilot valve and is positioned adjacent the tiltable clamp so as to be closed when said clamp is tilted by the leading end of the wire and another set of which is positioned adjacent the tiltable clamp so as to be actuated by the tiltable clamp when the wire is drawn in a direction opposite to the direction of feed to retract the wire from the guiding frame and around the package, and means actuated by said last-mentioned set of contacts for controlling the tensioning means.

5. A machine according to claim 1 further comprising sets of electrical contacts, one set of which is comprised by the means for actuating the pilot valve and is positioned adjacent the tiltable clamp so as to be closed when said clamp is tilted by the leading end of the wire, a second pilot valve in said pneumatic circuit, and means controlled by the wire-connecting means for operating said second pilot valve for supplying air to an opposite port of said slide valve to operate said slide valve to supply air under pressure to the opposite end of the cylinder of the tiltable clamp to open the wire-gripping means of said tiltable clamp.

6. A machine according to claim 1 further comprising sets of electrical contacts, one set of which is comprised by the means for actuating the pilot valve and is positioned adjacent the tiltable clamp so as to be closed when said clamp is tilted by the leading end of the wire and another set of which is positioned adjacent the tiltable clamp so as to be actuated by the tiltable clamp when the wire is drawn in a direction opposite to the direction of feed to retract the wire from the guiding frame and around the package, means actuated by said last-mentioned set of contacts for controlling the tensioning means, a second pilot valve in said pneumatic circuit, and means controlled by the wire-connecting means for operating said second pilot valve for supplying air to an opposite port of said slide valve to operate said slide valve to supply air under pressure to the opposite end of the cylinder of the tiltable clamp to open the wire-gripping means of said tiltable clamp.

7. A packaging machine for applying wire around a package or the like, said machine having a top plate for supporting a package, a frame of loop formation provided with a wire track for guiding a wire around the package, said frame having a lower horizontal beam immediately below the top plate, first and second vertical members extending upwardly from the ends of the lower horizontal beam, an upper horizontal beam extending between the upper ends of the vertical members, said lower beam having a first wire-receiving channel extending therethrough, the first vertical member having a vertical channel connected at its lower end to the first channel of the lower beam and forming a continuation thereof, said upper beam having a channel extending therethrough connected at one end to the upper end of the channel of said first vertical member, the second vertical member having a channel connected to the other end of the channel in the upper beam and extending downwardly, said lower beam having a second channel connected to the lower end of the channel in said second vertical member and extending through the lower beam in offset overlapping relation to the first channel in said lower beam, said channels in the vertical members and the upper beam being serially connected between the first and second channels in the lower beam to provide a wire-guiding track of loop formation, reversible means to feed wire through said wire-guiding track to form a loop with the portion adjacent the leading end of said wire in the second channel of the lower beam overlapping a portion of the wire in the first channel of the lower beam and to retract the wire from said track, a tiltable clamp at the end of the second channel of the lower horizontal beam, said clamp having wire-gripping means movable between opened and closed positions and adapted to receive the leading end of the wire fed through the track of the frame and to tilt in the direction of feed movement of the wire when engaged by said leading end of the wire, a pneumatic cylinder for moving the wire-gripping means between opened and closed positions, means for releasing a loop of wire from the track in the frame upon reversal of said feed means to embrace the package, means for tensioning the loop of wire about the package, means for holding the tensioned wire, means for connecting the ends of the tensioned loop of wire about said package, a set of electrical contacts, one of which is positioned adjacent the tiltable clamp so as to be closed when said clamp is tilted by the leading end of the wire and another of which is positioned adjacent the tiltable clamp so as to be actuated by the tiltable clamp when the wire is drawn in a direction opposite to the direction of feed to retract the wire from the guiding frame and around the package, a pneumatic cylinder for operating the wire-tensioning means, an electromagnetic valve controlling the supply of air through a conduit to the pneumatic cylinder of the wire-tensioning means, and electric circuit means connecting said other contact to the electromagnetic valve to control actuation of said electromagnetic valve.

8. A machine according to claim 7 in which the air conduit to the pneumatic cylinder of the tensioning means has a branch conduit, and further comprising another cylinder connected to said branch conduit, a piston in said last-mentioned cylinder, a relay contact adapted to be closed by said piston, a spring engaging said piston urging the relay contact to open position, a pneumatic cylinder for operating the means for holding the tensioned wire, an electromagnetic valve for controlling supply of air to said last-mentioned pneumatic cylinder, and electric circuit means controlled by said relay for energizing said last-mentioned electromagnetic valve.

9. A machine according to claim 8 further comprising a further pneumatic cylinder operating the wire-connecting means, means controlled by said last-mentioned electromagnetic valve for controlling the supply of air to the cylinder of said wire-connecting means, contacts cooperating with the wire-connecting means at each end of the stroke of its operating cylinder to control the operation of the wire-connecting means through the intermediary of electromagnetic valves and slide valves controlled by said last-mentioned electromagnetic valves, and means actuated by the contact which is closed at the end of the return stroke of the pneumatic cylinder for operating the wire-connecting means also controlling the operation of the wire-feeding means.

10. A packaging machine for applying wire around a package or the like, said machine having a top plate for supporting a package, a frame of loop formation provided with a wire track for guiding a wire around the package, said frame having a lower horizontal beam immediately below the top plate, first and second vertical members extending upwardly from the ends of the lower horizontal beam, an upper horizontal beam extending between the upper ends of the vertical members, said lower beam having a first wire-receiving channel extending therethrough, the first vertical member having a vertical channel connected at its lower end to the first channel of the lower beam and forming a continuation thereof, said upper beam having a channel extending therethrough connected at one end to the upper end of the channel of said first vertical member, the second vertical member having a channel connected to the other end of the channel in the upper beam and extending downwardly, said lower beam having a second channel connected to the lower end of the channel in said second vertical member and extending through the lower beam in offset overlapping relation to the first channel in said lower beam, said channels in the vertical members and the upper beam being serially connected between the first and second channels in the lower beam to provide a wire-guiding track of loop formation, reversible means to feed wire through said wire-guiding track to form a loop with the portion adjacent the leading end of said wire in the second channel of the lower beam overlapping a portion of the wire in the first channel of the lower beam and to retract the wire from said track, a tiltable clamp at the end of the second channel of the lower horizontal beam, said clamp having wire-gripping means movable between opened and closed positions and adapted to receive the leading end of the wire fed through the track of the frame and to tilt in the direction of feed movement of the wire when engaged by said leading end of the wire, a pneumatic cylinder for moving the wire-gripping means between opened and closed positions, means for releasing a loop of wire from the track in the frame upon reversal of said feed means to embrace the package, means for tensioning the loop of wire about the package, means for holding the tensioned wire, means for connecting the ends of the tensioned loop of wire about said package, a set of electrical contacts, one of which is positioned adjacent the tiltable clamp so as to be closed when said clamp is tilted by the leading end of the wire and another of which is positioned adjacent the tiltable clamp so as to be actuated by the tiltable clamp when the wire is drawn in a direction opposite to the direction of feed to retract the wire from the guiding frame and around the package, a pneumatic cylinder for operating the wire-tensioning means, an electromagnetic valve controlling the supply of air through a conduit to the pneumatic cylinder of the wire-tensioning means, said wire-connecting means comprising a twister block provided with a twister pinion and movable towards and away from the end of the wire, a pneumatic cylinder for moving said twister block, an electromagnetic valve controlling said last-mentioned cylinder, a rack bar for rotating said twister pinion, a pneumatic cylinder for actuating said rack bar, an electromagnetic valve controlling the rack bar operating cylinder, contact means actuated at the end of the stroke of the twister block for controlling the electromagnetic valve which in turn controls the rack bar cylinder through the intermediary of a slide valve to control flow of air to the last-mentioned cylinder, a further contact at the end of the rack bar stroke to energize an electromagnetic valve to reverse the slide valve, a pilot valve for controlling the flow of air to the cylinder for actuating the wire-gripping means, and means cooperating with said rack bar for controlling said mentioned pilot valve.

11. A packaging machine for applying wire around a package or the like, said machine having a top plate for supporting a package, a frame of loop formation provided with a wire track for guiding a wire around the package, said frame having a lower horizontal beam immediately below the top plate, first and second vertical members extending upwardly from the ends of the lower horizontal beam, an upper horizontal beam extending between the upper ends of the vertical members, said lower beam having a first wire-receiving channel extending therethrough, the first vertical member having a vertical channel connected at its lower end to the first channel of the lower beam and forming a continuation thereof, said upper beam having a channel extending therethrough connected at one end to the upper end of the channel of said first vertical member, the second vertical member having a channel connected to the other end of the channel in the upper beam and extending downwardly, said lower beam having a second channel connected to the lower end of the channel in said second vertical member and extending through the lower beam in offset overlapping relation to the first channel in said lower beam, said channels in the vertical members and the upper beam being serially connected between the first and second channels in the lower beam to provide a wire-guiding track of loop formation, reversible means to feed wire through said wire-guiding track to form a loop with the portion adjacent the leading end of said wire in the second channel of the lower beam overlapping a portion of the wire in the first channel of the lower beam and to retract the wire from said track, a tiltable clamp at the end of the second channel of the lower horizontal beam, said clamp having wire-gripping means movable between opened and closed positions and adapted to receive the leading end of the wire fed through the track of the frame and to tilt in the direction of feed movement of the wire when engaged by said leading end of the wire, a pneumatic cylinder for moving the wire-gripping means between opened and closed positions, means for releasing a loop of wire from the track in the frame upon reversal of said feed means to embrace the package, means for tensioning the loop of wire about the package, means for holding the tensioned wire, means for connecting and twisting the ends of the tensioned loop of wire about said package, pneumatic means actuating the wire-tensioning means, pneumatic means actuating the tensioned wire-holding means, pneumatic means actuating the wire-connecting means, a pneumatic circuit for air under pressure, a pneumatically operated slide valve for controlling the flow of air into and from the pneumatic cylinder, pneumatically operated slide valves for controlling flow of air into and from the pneumatic means, an electromagnetic valve for at least partly controlling each slide valve, a master slide valve, and an electromagnetic valve controlling the master slide valve.

12. A machine according to claim 11 in which the electromagnetic valve controlling the master slide valve is controlled by the wire-feeding means.

13. A machine according to claim 11 in which said master slide valve is operable to supply air to a reset circuit which admits air to a pneumatic cylinder for opening the wire track in the frame, to the cylinder for opening the wire gripping means of the tiltable clamp, and to pilot ports of the other slide valves to reset the latter to their initial position.

References Cited in the file of this patent
UNITED STATES PATENTS

| | | |
|---|---|---|
| 2,908,215 | Fawcett | Oct. 13, 1959 |
| 2,908,216 | Brouse et al. | Oct. 13, 1959 |